(12) United States Patent
Tran et al.

(10) Patent No.: US 9,877,009 B2
(45) Date of Patent: *Jan. 23, 2018

(54) LIDAR STEREO FUSION LIVE ACTION 3D MODEL VIDEO RECONSTRUCTION FOR SIX DEGREES OF FREEDOM 360° VOLUMETRIC VIRTUAL REALITY VIDEO

(71) Applicant: HypeVR, San Diego, CA (US)

(72) Inventors: Anthony Tran, San Diego, CA (US); Jason Juang, San Diego, CA (US)

(73) Assignee: HypeVR, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/139,183

(22) Filed: Apr. 26, 2016

(65) Prior Publication Data

US 2016/0249039 A1    Aug. 25, 2016

Related U.S. Application Data

(63) Continuation of application No. 15/047,525, filed on Feb. 18, 2016, now Pat. No. 9,369,689.

(Continued)

(51) Int. Cl.
*H04N 13/02* (2006.01)
*G06T 7/40* (2017.01)
(Continued)

(52) U.S. Cl.
CPC ....... *H04N 13/0239* (2013.01); *G01S 7/4972* (2013.01); *G01S 17/023* (2013.01);
(Continued)

(58) Field of Classification Search
CPC .................................................. H04N 13/0239
See application file for complete search history.

(56) References Cited

U.S. PATENT DOCUMENTS 9,369,689 B1 *   6/2016  Tran ....................... G06T 7/593
2011/0141300 A1   6/2011  Stec et al.
(Continued)

OTHER PUBLICATIONS

Jhala et al. "Stereo and Lidar—Based Pose Estimation with Uncertainty for 3D Reconstruction" VMV; Publication [online]. 2004 Retrieved Apr. 17, 2016: Retrieved from the internet: <URL: ftp://ftp.mpi-sb.mpg.de/pub/conferences/vmv04/submissions/103/lodha.pdf>; pp. 1-8.*

(Continued)

*Primary Examiner* — Andy Rao
*Assistant Examiner* — Tyler Edwards
(74) *Attorney, Agent, or Firm* — SoCal IP Law Group LLP; Jonathan Pearce

(57) ABSTRACT

A system for capturing live-action three-dimensional video is disclosed. The system includes pairs of stereo cameras and a LIDAR for generating stereo images and three-dimensional LIDAR data from which three-dimensional data may be derived. A depth-from-stereo algorithm may be used to generate the three-dimensional camera data for the three-dimensional space from the stereo images and may be combined with the three-dimensional LIDAR data taking precedence over the three-dimensional camera data to thereby generate three-dimensional data corresponding to the three-dimensional space.

24 Claims, 11 Drawing Sheets

Related U.S. Application Data

(60) Provisional application No. 62/119,821, filed on Feb. 24, 2015, provisional application No. 62/202,916, filed on Aug. 10, 2015.

(51) Int. Cl.

| | | |
|---|---|---|
| *H04N 13/00* | (2006.01) | |
| *G06T 19/20* | (2011.01) | |
| *G06T 7/60* | (2017.01) | |
| *G06T 7/00* | (2017.01) | |
| *G06T 19/00* | (2011.01) | |
| *G01S 17/02* | (2006.01) | |
| *G01S 17/89* | (2006.01) | |
| *G06T 5/00* | (2006.01) | |
| *G06T 5/50* | (2006.01) | |
| *G01S 7/497* | (2006.01) | |
| *G06T 7/593* | (2017.01) | |

(52) U.S. Cl.
CPC .............. *G01S 17/89* (2013.01); *G06T 5/002* (2013.01); *G06T 5/50* (2013.01); *G06T 7/40* (2013.01); *G06T 7/593* (2017.01); *G06T 7/60* (2013.01); *G06T 19/006* (2013.01); *G06T 19/20* (2013.01); *H04N 13/004* (2013.01); *H04N 13/0029* (2013.01); *H04N 13/0037* (2013.01); *H04N 13/0051* (2013.01); *H04N 13/0055* (2013.01); *H04N 13/0246* (2013.01); *H04N 13/0253* (2013.01); *G06T 2200/04* (2013.01); *G06T 2207/10021* (2013.01); *G06T 2207/10024* (2013.01); *G06T 2207/10028* (2013.01); *G06T 2207/20032* (2013.01); *G06T 2207/30204* (2013.01); *H04N 2013/0077* (2013.01); *H04N 2013/0081* (2013.01); *H04N 2013/0085* (2013.01); *H04N 2013/0096* (2013.01)

(56) References Cited

U.S. PATENT DOCUMENTS

2013/0300838 A1 11/2013 Borowski
2014/0043436 A1 2/2014 Bell et al.
2015/0379766 A1 12/2015 Newman et al.

OTHER PUBLICATIONS

Fremont et al. "Circular Targets for 3D Alignment of Video and Lidar Sensors"; Advanced Robotics, Taylor & Francis; Publication paragraph [online]. 2012. Retrieved Apr. 17, 2016. Retrieved from the Internet: <URL: https://hal.archives-ouvertes.fr/hal-00858103/document>; pp. 1-22.*
Jhala et al. "Stereo and Lidar-Based Pose Estimation with Uncertainty for 3D Reconstruction" VMV; Publication [online]. 2004 Retrieved Apr. 17, 2016: Retrieved from the internet: <URL: ftp://ftp.mpi-sb.mpg.de/pub/conferences/vmv04/submissions/103/lodha.pdf>; pp. 1-8.*
World Intellectual Property Organization, International Search Report and Written Opinion for International Application No. PCT/US23016/019396, dated May 3, 2016, 10 total pages.
Sanjit Jhala et al., "Stereo and Lidar-Based Pose Estimation with Uncertainty for 3D Reconstruction", Journal, Department of Computer Science University of California, Santa Cruz, Retrieved Apr. 17, 2016, ftp://ftp.mpi-inf.mpg.de/pub/conferences/vmv04/submissions/103/sanjit_jhala.pdf, 9 total pages.
Vincent Fremont et al., "Circular Targets for 3D Alignment of Video and Lidar Sensors", Advanced Robotics, Taylor & Francis, Retrieved Apr. 17, 2016, https://hal.archives-ouvertes.fr/hal-00858103/document, 23 total pages.
PTGui, Create High Quality Panoramas, online home page, http://www.ptgui.com/, last accessed Mar. 3, 2016, 8 total pages.
Google, Google's Project Tango, online home page, https://www.google.com/atap/projecttango/, last accessed Mar. 3, 12016, 5 total pages.
3D Systems, Rapid Prototyping, Advance Digital Manufacturing, 3D Printing, 3-D CAD, online home page, http://www.3dsystems.com/, last accessed Mar. 3, 2016, 4 total pages.
OpenCV, online home page, www.opencv.org, last accessed Mar. 3, 2016.
Panocam 3D—Stereoscopic and Panoramic Video Cameras—3d 360° videos production, online home page, http://www.panocam3d.com/, last accessed Mar. 3, 2016, 10 pages.
360Heros, World's First Fully Spherical 3D 360 Video and PhotoGear | 360Heros | VR | Virtual Reality, http://www.360heros.com/2014/01/worlds-first-fully-spherical-3d-360-videoand-photo-gear/, last accessed Mar. 3, 2016, 4 pages.
Christian Weissig et al., The Ultimate Immersive Experience: Panoramic 3d Video Acquisition, In Proceedings of the 18th international conference on Advances in Multimedia Modeling (MMM'12), Jan. 4-6, 2012, 11 total pages.
ThinkTankTeam, Project Beyond—Think Tank Team—Samsung Research America, online home page, http://thinktankteam.info/beyond/, last accessed Mar. 3, 2016, 9 total pages.
Matterport, 3D Models of Real Interior Spaces, online home page, http://matterport.com/, last accessed Mar. 3, 2016, 5 total pages.
Jean-Yves Bouguet, Camera Calibration Toolbox for Matlab, Article, last updated Oct. 14, 2015, 5 total pages.
Vogiatzis et al., Automatic Camera Pose Estimation from Dot Pattern, online article, http://george-vogiatzis.org/calib/, last accessed Mar. 3, 2016, 4 total pages.
Richard Hartley, Multiple View Geometry in Computer Vision, Second Edition, Cambridge University Press, published Apr. 19, 2004, 673 total pages.
Fusiello et al., A Compact Algorithm for Rectification of Stereo Pairs, article, Machine Vision and Applications (2000) 12: 16-22, Feb. 25, 1999, 7 total pages.
Rother et al., "GrabCut"—Interactive Foreground Extraction Using Iterated Graph Cuts, Aug. 2004, 6 total pages.
Zach et al., "A Duality Based Approach for Realtime TV-L1 Optical Flow", In Proceedings of Pattern Recognition (DAGM), Heidelberg, Germany, pp. 214-223, Sep. 12, 2007.
Taniai et al., Graph Cut Based Continuous Stereo Matching Using Locally Shared Labels, 2014 IEEE Conference on Computer Vision and Pattern Recognition, Jun. 23, 2014, pp. 1613-1620.
Besse et al., PMBP: PatchMatch Belief Propagation for Correspondence Field Estimation, Inproceedings, BMVC—Best Industrial Impact Prize award 2012, 11 total pages.
Heise et al., PatchMatch with Huber regularization for stereo matching. Computer Vision (ICCV), 2013 IEEE International Conference on Dec. 1, 2013, 8 total pages.
Zhang et al., As-rigid-as-possible stereo under second order smoothness priors. Computer Vision—ECCV 2014, vol. 8690 of the series Lecture Notes in Computer Science, 13th European Conference, Zurich, Switzerland, Sep. 6-12, 2014, Proceedings, Part II, 877 total pages.
Muninder et al., Robust segment-based stereo using cost aggregation, In Proceedings British Machine Vision conference Sep. 2014, 11 total pages.
Sun et al., Real-time local stereo via edge-aware disparity propagation, Pattern Recognition Letters, Available online Aug. 1, 2014, 6 total pages.
Sun et al., Stereo matching with reliable disparity propagation, 2011 International Conference on 3D Imaging, Modeling, Processing, Visualization and Transmission, May 16, 2011, pp. 132-139.
Levinson et al., Automatic Online Calibration of Cameras and Lasers, Robotics: Science and Systems Proceedings 2013, 8 total pages.
P'erez et al., Poisson Image Editing, Journal, ACM Transactions on Graphics (TOG)—Proceedings of ACM, vol. 22 Issue 3, Jul. 2003, pp. 313-318.

(56) References Cited

OTHER PUBLICATIONS

Richardt et al., Megastereo: Constructing High-Resolution Stereo Panoramas, Computer Vision and Pattern Recognition (CVPR), 2013 IEEE Conference on Jun. 23, 2013, 8 total pages.
Li et al., "Mobile Panoramic Multispectral Scanner (MPMS)—A New Ground-Based Stereo Panoramic Scanning System for Planetary Robotic Exploration", in International Workshop on Instrumentation for Planetary Missions, Oct. 2012, LPI Contribution No. 1683, p. 1059.
Peleg et al., "Omnistereo: Panoramic Stereo Imaging", in IEEE Transactions on Pattern Analysis and Machine Intelligence, vol. 23, No. 3, Mar. 2001, pp. 279-290.
S'anchez et al., TV-L1 Optical Flow Estimation, article published in Image Processing on Line on Jul. 19, 2013, 14 total pages.

\* cited by examiner

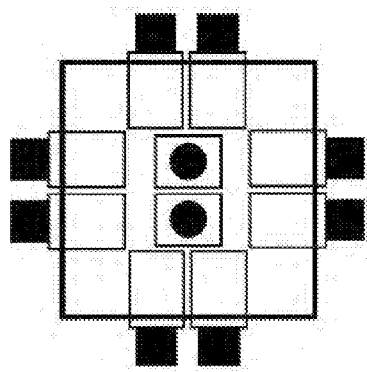
FIG. 3B
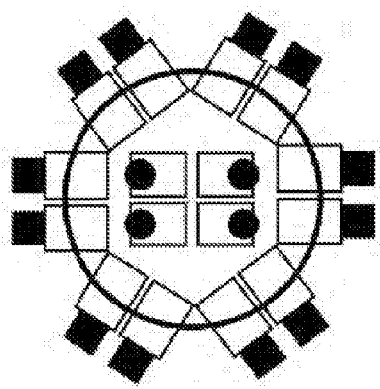
FIG. 3D
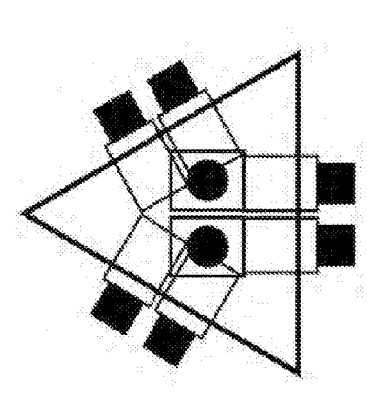
FIG. 3A
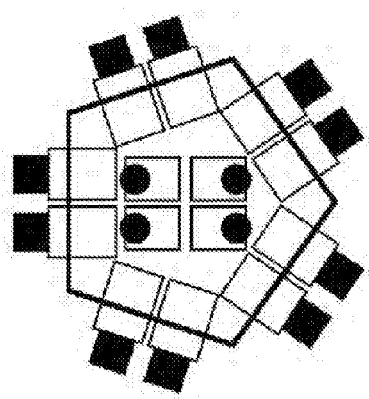
FIG. 3C
FIG. 3

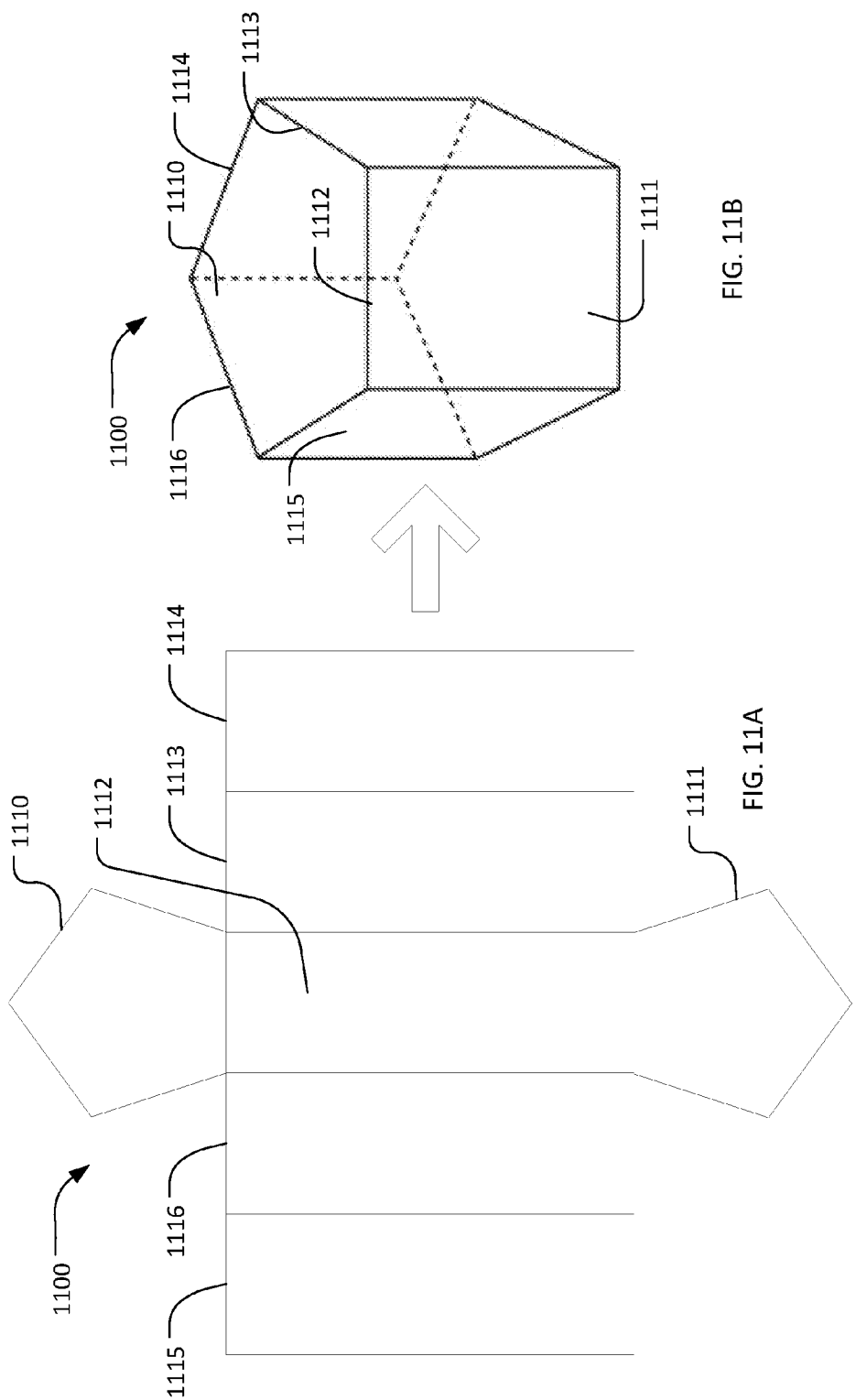

LIDAR STEREO FUSION LIVE ACTION 3D MODEL VIDEO RECONSTRUCTION FOR SIX DEGREES OF FREEDOM 360° VOLUMETRIC VIRTUAL REALITY VIDEO

RELATED APPLICATION INFORMATION

This patent is a continuation of patent application Ser. No. 15/047,525 filed Feb. 18, 2016 entitled "Lidar Stereo Fusion Live Action 3D Model Video Reconstruction for Six Degrees of Freedom 360° Volumetric Virtual Reality Video", which claims priority from U.S. provisional patent application No. 62/119,821 entitled "Lidar Assisted 3d Depth Based Image Stitching Method for Seamless Stereo Panoramic 360 Degree images and Video" filed Feb. 24, 2015 and from U.S. provisional patent application No. 62/202,916 entitled "Lidar Stereo Fusion Live Action 3d Model Video Reconstruction for 6-DOF Virtual Reality" filed Aug. 10, 2015.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to three dimensional video capture and more specifically to a system for fusing live-action stereoscopic video with LIDAR three-dimensional data to create volumetric virtual reality video.

Description of the Related Art

Prior art systems for generating three-dimensional environments for virtual reality (VR) application fall into two basic categories. The first category is fully-rendered three-dimensional environments. These environments are generally created by developers and artists using "game engine" software to create three-dimensional objects within a space and to apply art and lighting effects to those objects to give them the appearance of physical objects. Thereafter, a user may "enter" the three-dimensional environment created by the developer and artist.

These environments have the benefit of being fully-realized three dimensional spaces. Typically, avatars of a user (or in the case of VR, the user themselves) can move freely about within such spaces because they are designed for the purpose of being fully-explored. The problem with these spaces is that they only estimate real locations and, more basically, require days or weeks of work by developers, artists, and, if you consider the development time for the game engine, even longer times to create the software that enables other developers and artists to make the environment at all. Though there are tools that can automate parts of these environment-creation processes, much by-hand work must be done to make the believable and fully navigable by an avatar or user. More complex systems combine the two methods to perform detailed photogrammetry on locations that will be or have been the subject of two-dimensional filming in order to derive some three-dimensional data. Then, after-the-fact, the three-dimensional data may be combined with the video to create somewhat of an immersive video environment. Because of the time and work involved, none of these systems is really suitable for capturing any "live-action" video while easily recording the characteristics of the associated three-dimensional space.

The other category is an "on-rails" video or series of images created by cameras with overlapping fields of view such that an entire sphere of images may be "stitched" together by software to create a "bubble" around a viewer. This category feels a bit like going along for a ride in its video format incarnations or, in individual image capture-oriented incarnations, transitioning from one fixed position to another. While within the "bubble", a user or avatar may "look around" at the interior of the sphere of images incasing them. These systems provided very high-quality images that accurately reflect the place in which those images were taken (typically an outdoor space). However, these images suffer from parallax issues and the stitched images are often poorly aligned.

However, the avatar or user may not deviate from the pre-selected path or fixed positions. And, the images have no three-dimensional component whatsoever. Because movement is not envisioned, it is less-important to have depth information. But, for true three-dimensional environments with at least some degree of freedom of movement within the environment, depth information, like that available in the fully-realized three dimensional environments created using "game engine" style software is highly desirable.

Stereoscopic photography, using two cameras to capture the three dimensional characteristics of elements visible in two corresponding images created by the two cameras, has been used to estimate the relative depth of objects within images. However, because virtual reality systems preferably use fully-immersive fully-surrounding spherical spaces, often exteriors, and further because exteriors have depths that are virtually infinite (the sky) and tend to have long fields of view (e.g. a building several blocks away), stereoscopic photography's applicability is limited. In order to calculate the depths, a visibly perceptible disparity between the two corresponding images must be present. At great distances, the disparity between objects within two images is minimal if it is present at all. So, the use of stereographic photography to record video, often in exterior, open spaces, is inaccurate and insufficient to create fully-surrounding three-dimensional spherical spaces in which virtual reality users can move.

Depth sensor based systems such as the Microsoft® Kinect enable similar functionality, but are only capable of operating in one direction—namely toward a user—and have extremely limited range. Therefore, these types of systems are not suitable to outdoor environments or 360° spherical video recording and three-dimensional reconstruction of filmed environments.

Similarly, LIDAR systems have existed for some time, but have been prohibitively expensive for general use. In addition, the depth data generated by LIDAR systems has not been easily combinable with other data or easily translatable into data that may be used to re-create three-dimensional environments. This is, in part, because the LIDAR data, though incredibly accurate, is very sparse within a given target environment—meaning that the LIDAR depth data points are relatively distant from one another. This sparsity makes LIDAR data alone inadequate for recreating accurate three-dimensional renderings of target environments.

DESCRIPTION OF THE DRAWINGS

FIG. 3 is made up of FIGS. 3A, 3B, 3C, and 3D; each of which is a different example configuration of an omnidirectional, stereographic camera rig for capturing three-dimensional live action video.

FIG. 11, made up of FIGS. 11A and 11B, are a polygonal projection of stereo camera images.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Description of Apparatus

Figure 1:
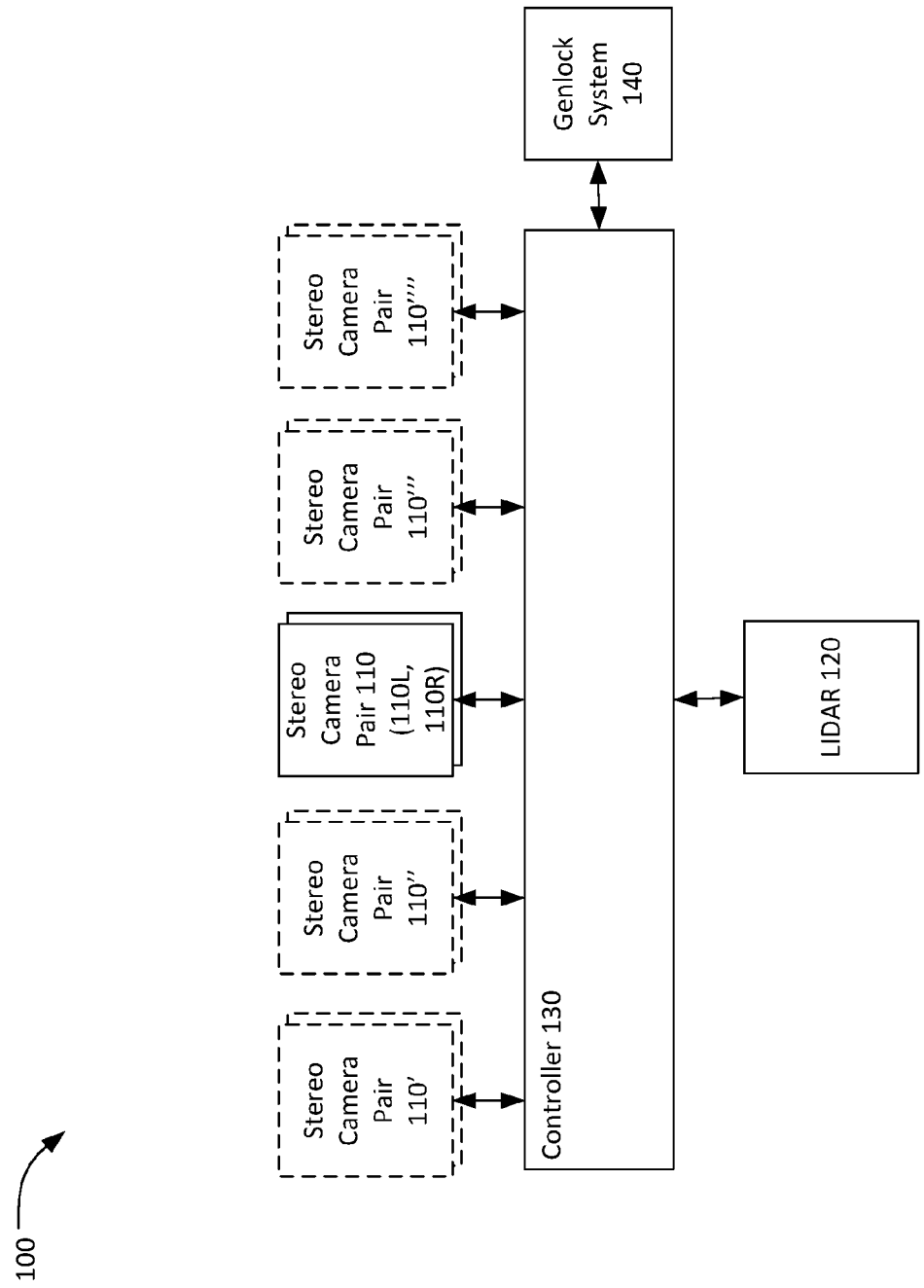
FIG. 1 is a block diagram of a system for fusion of stereographic images and LIDAR.

Referring now to FIG. 1 is a block diagram of a system 100 for fusion of stereographic images and LIDAR. The system 100 includes at least one stereo camera pair 110, made up of 110L, 110R (with 110L being a left camera and 110R being a right camera). There may be a one or more additional stereo camera pairs, such as stereo camera pairs 110', 110'', 110''', and 110''''. The stereo camera pair 110 may be used to create stereo images from which three-dimensional camera data may be derived. As used herein "three-dimensional camera data" means three-dimensional data that is derived from simultaneous images captured by a stereo camera pair.

The LIDAR 120 is a depth sensing technology that relies upon at least one laser and the detection of reflections from that at least one laser to generate depth maps for three-dimensional spaces. There are various embodiments of LIDARs. Some use a single, scanning laser that moves across a field of view, others rely upon multiple discrete beams that move across individual fields of view. Still others use beam splitters or similar technologies to simultaneously scan multiple areas with a single discrete laser. The number of independent sensors for reflected beams may also vary from one to many. Less-expensive, modern LIDARs typically rely upon a combination of optics and one large sensor to collect reflected beams and to, thereby, derive data. Preferably, three-dimensional data generated by a LIDAR is in the form of an (X,Y,Z) point field, relative to the LIDAR.

As used herein the phrase "three-dimensional LIDAR data" means three-dimensional data captured or derived from three-dimensional data generated by a LIDAR.

Both the stereo camera pair 110 and the LIDAR 120 operate at the direction of a controller 130. The controller 130 may be in whole or in part a general purpose computing device. Though shown as a single controller 130, multiple independent controllers may interact, for example, an individual controller for the LIDAR and another for one or more stereo camera pairs. The controller 130 orchestrates interactions between each of the stereo camera pairs (e.g. stereo camera pair 110) and the LIDAR 120. The controller 110 may merely capture and store camera and LIDAR data that may later be used to create three-dimensional data describing a target three-dimensional environment. Alternatively, the controller 110 may act to capture, store, and to thereafter perform calculations suitable to generate three-dimensional data describing a target three-dimensional environment.

The controller 130 may be in communication with or include a generator locking system 140. Generator locking (genlock) is a system or device that is used to synchronize sources of time-based material such as audio or video. Here, with multiple pairs of stereo cameras 110 and LIDAR 120, each independently generating content, the genlock system 140 provides a single-source timestamp on each set of data (images or LIDAR data) generated so that it may be accurately synchronized as it is combined by the controller 130. Preferably, the genlock system 140 may be a global positioning system (GPS) receiver with access to or receipt of extremely accurate time data. However, other methods and systems for performing genlock are known in the art.

As used herein, the phrase "three-dimensional data" means data including depth information, relative to at known position, sufficient to generate a three-dimensional scene corresponding to a three-dimensional space around the location from which the data used to generate the three-dimensional data was captured.

Figure 2:
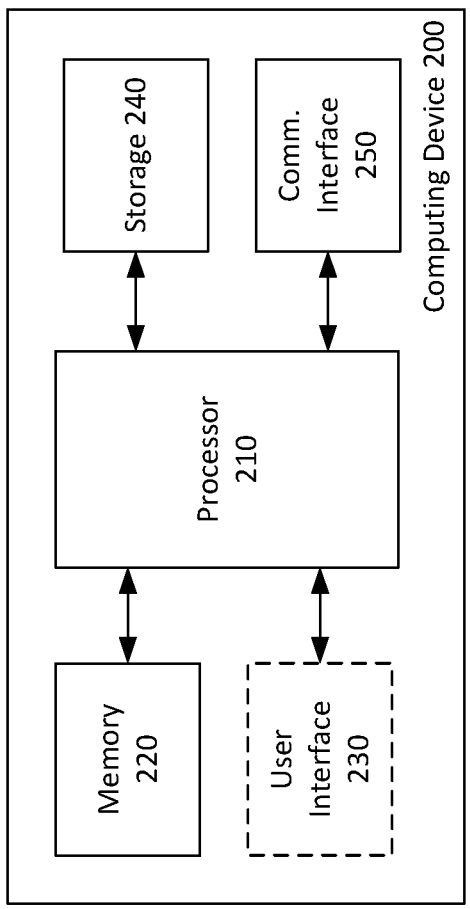
FIG. 2 is a block diagram of a computing device.

Turning now to FIG. 2, is a block diagram of an exemplary computing device 200, which may be the controller 130 of FIG. 1. As shown in FIG. 2, the computing device 200 includes a processor 210, memory 220, optionally, a user interface 230, and a communications interface 240. Some of these elements may or may not be present, depending on the implementation. Further, although these elements are shown independently of one another, each may, in some cases, be integrated into another.

The processor 210 may be or include one or more microprocessors, microcontrollers, digital signal processors, application specific integrated circuits (ASICs), or a system-on-a-chip (SOCs). The memory 220 may include a combination of volatile and/or non-volatile memory including read-only memory (ROM), static, dynamic, and/or magnetoresistive random access memory (SRAM, DRM, MRAM, respectively), and nonvolatile writable memory such as flash memory.

The memory 220 may store software programs and routines for execution by the processor. These stored software programs may include an operating system software. The operating system may include functions to support the communications interface 240, such as protocol stacks, coding/decoding, compression/decompression, and encryption/decryption. The stored software programs may include an application or "app" to cause the computing device to perform portions of the processes and functions described herein. The word "memory", as used herein, explicitly excludes propagating waveforms and transitory signals. Likewise, the phrase "storage medium," as used herein, means "non-transitory computer readable medium" which explicitly excludes propagating waveforms and transitory signals.

The user interface 230, if present, may include a display and one or more input devices such as a touch screen, keypad, keyboard, stylus or other input devices.

Storage 240 may be or include non-volatile memory such as hard disk drives, flash memory devices designed for long-term storage, writable media, and proprietary storage media, such as media designed for long-term storage of photographic or video data (as used in conjunction with cameras, like the stereo camera pair 110).

The communications interface 250 may include one or more wired interfaces (e.g. a universal serial bus (USB), high definition multimedia interface (HDMI)), one or more connectors for storage devices such as hard disk drives, flash drives, or proprietary storage solutions. The communications interface 250 may also include a cellular telephone network interface, a wireless local area network (LAN) interface, and/or a wireless personal area network (PAN) interface. A cellular telephone network interface may use one or more cellular data protocols. A wireless LAN interface may use the WiFi® wireless communication protocol or another wireless local area network protocol. A wireless PAN interface may use a limited-range wireless communication protocol such as Bluetooth®, Wi-Fi®, ZigBee®, or some other public or proprietary wireless personal area network protocol. When the computing device 200 is deployed as part of a camera and LIDAR rig, such as the system 100, a wireless PAN interface may be used to communicate with the active acoustic filter devices 110L, 110R. The cellular telephone network interface and/or the wireless LAN interface may be used to communicate with devices external to the computing device 200.

The communications interface 250 may include radio-frequency circuits, analog circuits, digital circuits, one or more antennas, and other hardware, firmware, and software necessary for communicating with external devices. The communications interface 250 may include one or more specialized processors to perform functions such as coding/decoding, compression/decompression, and encryption/decryption as necessary for communicating with external devices using selected communications protocols. The communications interface 250 may rely on the processor 210 to perform some or all of these function in whole or in part.

As discussed above, the computing device 200 may be configured to perform geo-location, which is to say to determine its own location. Geo-location may be performed by a component of the computing device 200 itself or through interaction with an external device suitable for such a purpose. Geo-location may be performed, for example, using a Global Positioning System (GPS) receiver or by some other method.

Turning now to FIG. 3, examples of different example configuration of an omnidirectional, stereographic camera rig for capturing three-dimensional live action video are shown in FIGS. 3A, 3B, 3C, and 3D. The images are from a top perspective on the camera rigs. FIG. 3A is a rig including a total of four stereo pairs of cameras (8 cameras), three top camera pairs mounted parallel to the horizon (the "horizon" in this situation being a circular disc perpendicular to the viewer's position relative to the rig) and one camera pair aimed upward. These cameras, and preferably all cameras in each rig, have a field of view of 110 degrees or greater to ensure the best possible coverage of the area. Rectilinear lenses are preferred, but wide angle ("fish-eye") lenses may also be used.

FIG. 3B is a five stereo camera pair rig (10 cameras), with four camera pairs mounted parallel to the horizon and one camera pair aimed upward. FIG. 3C is a seven camera pair rig (14 cameras) with five camera pairs aimed slightly above the horizon and two camera pairs aimed generally upward at angles. Finally, FIG. 3D is an eight camera pair rig (16 cameras) with six camera pairs mounted parallel to the horizon and two camera pairs aimed generally upward.

Virtually any configuration of sets of stereo camera pairs may be used, so long as the cameras are arranged in stereoscopic pairs and there is sufficient overlap that sets of images resulting from each camera pair may be joined to adjacent set of images to form a cohesive whole. Camera rigs of seven pairs (14 cameras) or eight pairs (16 cameras) are preferred for full coverage. Further, as a part of calibration of the camera rig including any number of stereo camera pairs, the intrinsic and extrinsic parameters within each camera pair and between the camera pairs must be known or learned.

Intrinsic parameters define the relationships between pixel locations in images created by the stereo camera pairs and real world units. Intrinsic parameters include focal length (the distance between the lens and the image plane), principal point offset (the point at which a line perpendicular to the image plane and passing through the lens intersects the image plane), and the axis skew (the extent to which an axis leans toward another axis). Knowing these intrinsic parameters enables translation of images created by the camera into real-world sizes and measurements upon which mathematical calculations may be performed.

Extrinsic parameters define the relationship of the camera to the exterior world. These parameters enable operations such as defining directions and locations relative to other objects (including other cameras). These parameters help to place the camera in the world and to determine the relative view of the camera (e.g. distance from objects or whether some objects are occluded by other objects depending on the camera's perspective in the world).

Figure 4:
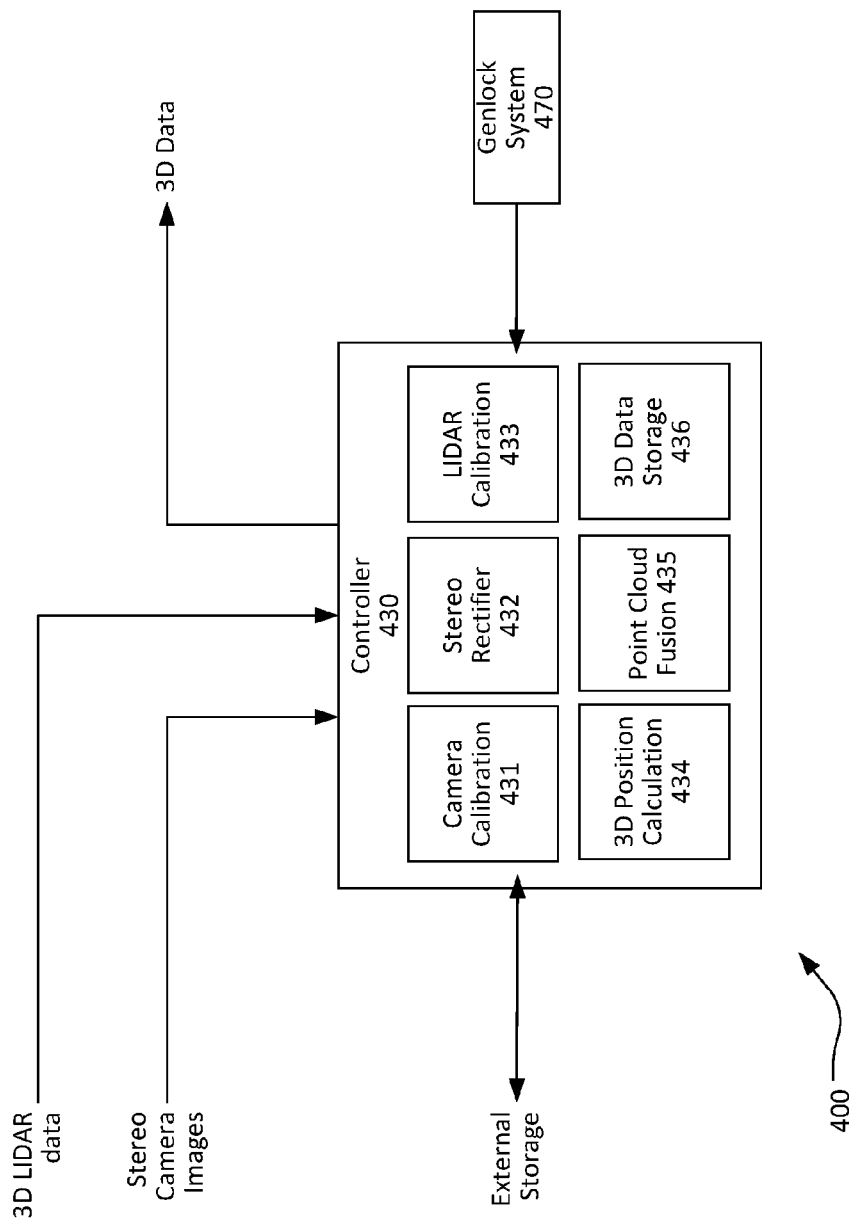
FIG. 4 is a functional block diagram of a controller for a system for fusion of stereographic images and LIDAR.

FIG. 4 is a functional block diagram of a controller for a system 400 for fusion of stereographic images and LIDAR. The controller 430 includes functions for camera calibration 431, for stereo rectification 432, for LIDAR calibration 433, for three-dimensional position calculation 434, for point cloud fusion 435 and for three-dimensional data storage 436. A genlock system 470 may be included as a part of the controller 430 or external to the controller (as shown).

Though shown as a part of a single controller 430 (like controller 130 of FIG. 1), the functional aspects of the system 400 may in fact be in a number of different physical components. For example, camera calibration 431 may be built-in to a camera rig such that sets of cameras or a controller is aware of the rig into which it is placed and the cameras may work together to determine their own intrinsic and extrinsic parameters. Similarly, three-dimensional data storage 436 may be external to a controller or may be within one or more stereo cameras. For simplicity, the functional components are shown as internal to the controller 430, but various embodiments are envisioned.

The camera calibration 431 is the process by which the system 400 determines the relative internal and external parameters of the sets of stereo camera pairs. The internal parameters enable images created by stereo camera pairs to be compared to derive physical measurements of external dimensions seen in the images. For example, if the interocular distance (distance between cameras), focal points and focal length of a stereo camera pair are known, images created by those pairs can be used to translate objects appearing in images into depths in three-dimensional space using relatively simple trigonometry and algebra. These determinations rely upon finding the same point in both of the images, then determining the distance, in the images, the same point is apart. That difference can be translated into depth with smaller distances (disparity) meaning that the object is further away, while larger distances (disparity) meaning that the object is closer. But, to perform these calculations, the intrinsic and extrinsic parameters necessary to calculate those depths (or disparity) must be known or determined through calibration. This is the process that camera calibration 431 performs.

One method for performing this calculation relatively accurately, is to rely upon external markers with known parameters. Such markers include, for example, checkerboard style markers wherein the squares of the checkerboard are a known width and height. Corresponding checkerboards (or individual boxes within checkerboards) may be relatively easily distinguished, either manually by an individual or automatically by a computer vision algorithm. Then, the disparity between the boxes or checkerboards is calculated and, with the known width and height available, the intrinsic and extrinsic parameters of a stereo camera pair may be determined. Various other methods and different kinds of markers for performing this type of calibration are known in the art.

The stereo rectifier 432 is a functional aspect of the controller 430 that may be used to calculate the disparity of various aspects of pairs of stereo images taken by a stereo camera pair. As discussed above with respect to calibration, disparity may be used to derive a relative depth from that the corresponding images created by a stereo camera pair.

LIDAR calibration 433 is another function of the controller 430. A LIDAR must be calibrated relative to the cameras so that resulting data from the stereo camera pairs may be compared with three-dimensional LIDAR data generated by the LIDAR. The calibration process for the cameras and LIDAR is discussed more fully below.

Three-dimensional position calculation 434 is yet another function of the controller 430. As discussed above, this calculation may take place on a device physically distinct from the controller 430, but is described as being a part of the controller 430 for ease of description. The three-dimensional position calculation 434 converts disparity data from the stereo camera pairs and three-dimensional LIDAR data into three-dimensional data for a three-dimensional space in which the camera rig and LIDAR combination records film. This process is discussed more fully below with respect to FIG. 8.

The three-dimensional data storage 436 is used to store three-dimensional data. This data may include, for example, the stereo image pairs for a frame of video, three-dimensional LIDAR data for a corresponding time, the time-stamp data provided by the genlock system 470, and may include secondary meta-data corresponding to calculated disparity and/or depth data derived from the data. By retaining the components that makeup the derived three-dimensional data, subsequent calculations may be performed with the same underlying data sets to enable still-better three-dimensional data to be derived therefrom, should better algorithms be created in the future.

This three-dimensional data storage 436 may be local or may be in whole or in part, external to the controller 430.

Figure 5:
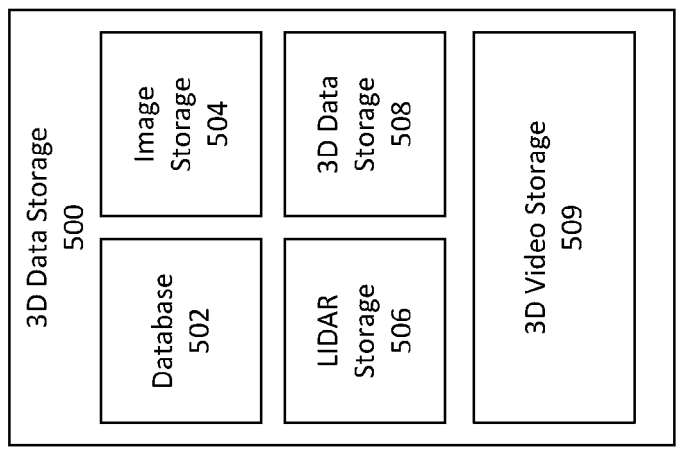
FIG. 5 is a functional block diagram of a three-dimensional data storage system.

FIG. 5 is a functional block diagram of a three-dimensional data storage system 500. The system 500 may be the three-dimensional data storage 436 of FIG. 4 or may be the external storage of FIG. 4. The three-dimensional data storage system 500 includes a database 502, image storage 504, LIDAR storage 506, three-dimensional data storage 508 and three-dimensional video storage 509. Though each of these elements are shown as making up a part of the system 500, one or more may not be present. Alternatively, one or more may be subsumed within another.

The database 502 may be used to store data pertaining to the relationship between recorded images, LIDAR data, and resulting three-dimensional data. The database 502 may be updated as disparity, depth and three-dimensional data algorithms operate to appropriately relate base data and resulting three-dimensional data. Further, the database may provide a structure for enabling readers or players of three dimensional data generated through the systems and processes described herein to be accessed for replay or further editing.

The image storage 504 may be used to store series of corresponding frames of video as fixed images. The database 502 may link images that are identified by a genlock system (e.g. 470 in FIG. 4) as having been captured at the same time as such. In this way, for a camera rig covering a 360 degree spherical space, the images that may be used to create one spherical frame of video may be identified as corresponding to one another. The image storage 504 may rely upon traditional video data formats or may use proprietary formats such that meta data, like the time stamp data, may be encoded directly into one or more frames of video as it is created.

The LIDAR storage 506 may be used to store LIDAR data that is created as a result of the operation of the LIDAR 120 (FIG. 1). This data may be on a per-frame-of-video basis and may be stored in various forms, such as a matrix of depth data with associated three-dimensional (x, y, z) coordinates relative to the LIDAR 120 itself. This LIDAR storage 506 may store the LIDAR data along with an associated time stamp, either in the database 502 or in the LIDAR storage 506 itself.

Three-dimensional data storage 508 may be used to store three-dimensional data generated using the images stored in image storage 504 and the LIDAR data stored in LIDAR storage 506. The three-dimensional data 508 may include disparity data, depth data, and an overall three-dimensional map for each frame of video captured as represented in the image storage 504.

In comparison, the three-dimensional video storage 509 may store a proprietary three-dimensional video data format that is used to provide both live-action video and three-dimensional data in one package for playback by a playback device or editing by an editing device. Because traditional video formats are two-dimensional, they are inadequate for representing the depth and three-dimensional nature of the three-dimensional data generated by the systems and processes described herein. This generated three-dimensional video may be stored in the three-dimensional video storage 509.

Description of Processes

Figure 6:
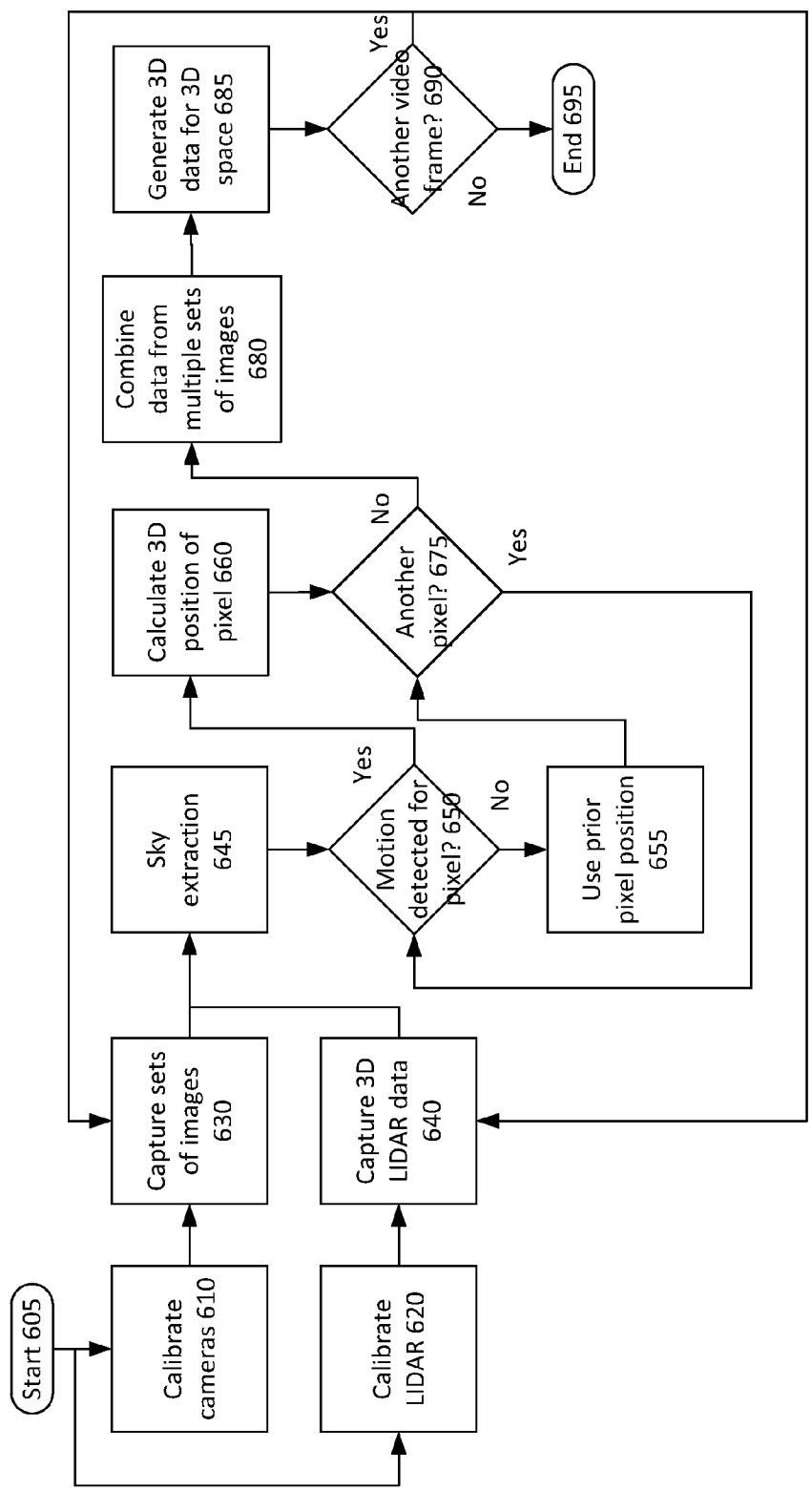
FIG. 6 is a flowchart of a method for fusing stereographic images and LIDAR to create three-dimensional data.

FIG. 6 is a flowchart of a method for fusing stereographic images and LIDAR to create three-dimensional data. The method begins at start 605 and operates continuously until the end 695 is reached. Though shown as a single process, multiple, simultaneous processes could be taking place at once. For example, multiple core or multiple processor systems could operate, each on an individual frame of video, simultaneously such that multiple iterations of the same process shown in FIG. 6 can be taking place simultaneously.

First, the cameras pairs are calibrated at 610. The intrinsic and extrinsic parameter of the cameras may be calculated with the aid of external markers, such as the checkerboard marker described above with reference to FIG. 4. Because the actual distance between each external marker is known, such external markers may be used to create a mapping between the three-dimensional position of a marker and the coordinate of the marker in images created by the camera pairs. Given sufficient amount of correspondence between two images, the unknown intrinsic and extrinsic parameters in the cameras can be solved using well-known methods.

Solving the intrinsic parameters and extrinsic parameters between two cameras are well known, but solving it with multiple cameras is more difficult. For example, suppose there are three front facing cameras A B and C. One can solve for the intrinsic parameters and extrinsic parameters for A to B, B to C. In a perfect measurement, noise-free world the parameters for A to B combined with those from B to C should result in a good measure for from A to C. In reality, each of these measurements is imperfect and noise-filled. So simply combining the intrinsic parameters and extrinsic parameters from A to B, B to C is likely to result in a large reprojection error between A to C. Here, the simple combination of the two A to B, and B to C is unlikely to be accurate because of imperfection in measurements and noise in the images. Thus, reprojection error means error introduced by basing an estimate upon insufficiently-accurate underlying data. So, instead, an estimate of the intrinsic and extrinsic parameters for each camera is taken by minimizing the difference between a known vector and a known pixel within the scene to calibrate the cameras relative to one another using captured images.

Next, each stereo camera pair is further rectified by pushing the epipole to infinity, so that feature matching for the disparity estimation process (discussed below) can be performed along a single scanline to reduce computation. The "epipole" as used herein is the point in the disparity data from the second of a stereo camera pair at which the first camera of a stereo camera pair is centered. "Rectification" as used herein is a process of virtually rotating the camera along the optical centers until the focal planes becomes coplanar. To perform rectification of the estimate of intrinsic and extrinsic parameters for each camera, it is preferred that the stereo camera pairs be as parallel as possible. This enables the rectification process to rotate the images very little which minimizes distortion and resolution loss as digital images quality degrades with rotation or other modification. Because there are infinite possibilities for rotating the images to make the focal planes coplanar, additional constraints may be introduced to limit the search fields. For example, the new x-axis may be limited so as to always be in the direction of the baseline. The new y-axis may be limited so as to always be orthogonal to new x-axis and the original z-axis. Finally, the new z axis may be limited so as to always be orthogonal to baseline and the original y-axis.

Figure 7:
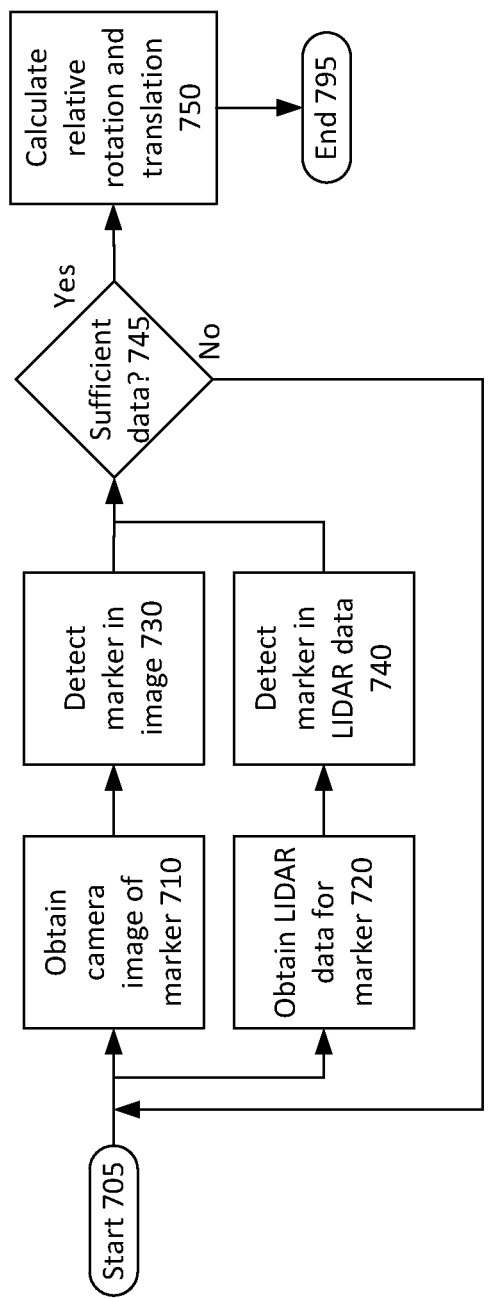
FIG. 7 is a flowchart of a method for calibration of a LIDAR relative to stereoscopic cameras.

Next, the LIDAR is calibrated at 620. The process of LIDAR calibration is disclosed with reference to FIG. 7. The process includes calculation of the extrinsic parameters between the LIDAR and one or more of the camera pairs. First, camera images and LIDAR data for an external marker are obtained at 710 and 720. For the external marker, a circular hole on a flat surface with a known radius may be used. The use of a circular hole-based external marker allows straightforward feature extraction in both the camera images and the LIDAR data because, as discussed more below, circles are best for detection in both image data and LIDAR data.

The location and radius of the marker is detected in the image at 730. So long as the color intensity of the flat surface of the marker and the background behind the circle hole is sufficiently distinct, Hough circle detection can be applied to roughly detect the location and the radius of the circular marker.

Next, the marker is detected in the LIDAR data at 740. Since there is depth discontinuity between the marker and the background, the LIDAR is able to pick up the contour of the circle. A circular hole is also preferred over a rectangular hole because the LIDAR data is typically in the form of a sequence of horizontal scan lines. Thus, a LIDAR may be unable to detect the horizontal sides of a rectangular hole. This leaves the LIDAR data without sufficient options for matching the points in the LIDAR to pixels on a corresponding image. However, using the circular marker, a point cloud sphere fitting algorithm can be applied to roughly detect the location and radius of the sphere.

Next, a determination is made, for example by a controller 430, whether there is sufficient data to complete the calibration of the LIDAR. In short, there must be sufficient fidelity and data available from the image (or images) and the LIDAR to adequately derive the extrinsic parameters between the LIDAR and one or more cameras. If the data gathered is insufficient ("no" at 745), the process may restart with additional images being captured at 710 and additional LIDAR data being obtained at 720.

However, if the data obtained appears to be sufficient ("yes" at 745), then the process may continue with the calculation of relative rotation and translation between the LIDAR and the camera(s) at 750. It may be assumed that the geometry transformation between a camera and LIDAR is pure translation, therefore the external circular marker should be placed as parallel as possible to the camera used for the image. Conceptually, the image of the marker is rotated virtually and manually to be parallel with the LIDAR points by making sure the circle in the RGB image is exactly a circle instead of an oval.

In order to perform the LIDAR to stereo camera calibration, the relative location of the image data must be made to match the LIDAR data. Once matched, the relative position and orientation of the LIDAR (i.e. the external parameters) to the stereo cameras may be calculated. In order to find the relative position, the differences between the detected "visual" circular marker from the stereo images and the detected "depth" circular marker may be minimized so that the two circles, detected using different processes, match as well as possible. The resulting translation and rotation may be stored as the extrinsic parameters (or the translation and rotation relative to one or more of the stereo camera pairs).

Returning to FIG. 6, once the cameras and LIDAR have been calibrated corresponding sets of images (at 630) and LIDAR data (at 640) may be captured. The captured sets of images correspond to a 360° sphere based upon overlapping two-dimensional images created in by the stereo camera pairs and the three-dimensional LIDAR data 640 comprises a point or depth field map of the same location. The three-dimensional LIDAR data is sparse, but extremely accurate. The images are visually accurate, but the three-dimensional data derivable therefrom is of less accuracy and fidelity than the LIDAR data. Thus, the combination of the two may be better suited for generating a more-accurate three-dimensional representation of the three-dimensional space in which the images and LIDAR data were captured.

Once the images and LIDAR data are obtained at 630 and 640, sky extraction is performed to lower the overall computational requirements for calculating depth within the three-dimensional space. Outdoor scenes are virtually guaranteed to include sky (or a sky equivalent for purposes of calculating depth). For purposes of depth calculation, the sky has a few special properties. First, the sky has infinite depth relative to the LIDAR and camera rig. Second, the sky is usually large, monolithic, typically a single color (or range of gradient colors) and it is without discernible textures. None of these attributes are particularly useful in calculating depth. If the sky is effectively infinitely far away, there is little point to "calculating" its depth using images or LIDAR. Further, because it is relatively-easily detectable, it can be conveniently excluded from depth calculations without adverse effect on the overall three-dimensional data generated for a three-dimensional space.

Excluding the sky (or a detected sky region) has the added benefit of avoiding the extensive process of computing three-dimensional data for it. In order to exclude sky, first edge detection (e.g. Sobel edge detection) is applied to a subject image. Next, morphology closing may be used to close the edge detection result. In this way, the "ends" of the detected sky region are intelligently joined to identify a rough shape for a sky region in a given image. Refining algorithms, such as a grabcut, may be applied to refine the shape of the sky region in an image by initializing the non-edge region as absolute background—meaning that the non-edge regions that are in absolute background are defined as background and will not have any depth calculation performed thereon because they are sky, effectively infinite depth. Depth calculations will be performed on the remaining regions. Lastly, a weighted median filter may be applied to further refine the result near the boundary of the sky. If the pixel is classified as sky, then the depth of the pixel is set to infinity, thereby shortcutting any algorithmic calculations for those regions classified as sky. The exclusion of sky regions enables the remainder of the depth algorithm to function more quickly and, overall, to require lower computational resources per video frame.

Next, a determination is made whether a pixel of an image has moved relative to the same pixel of an image in last frame of video at 650. In the case in which this is the first frame of video, every pixel has "moved" from not being present to being present, but in subsequent frames, the detection of movement enables the algorithm to further reduce computational load by only calculating depths for portions of images that have changed between frames. If a pixel has not moved ("no" at 650), then the pixel three-dimensional location from the previous frame is used at 655. If the pixel has moved ("yes" at 650), then the three-dimensional position of the pixel may be calculated at 660. In order to detect motion, various motion detection algorithms may be used, such as the TV-L1 optical flow estimation. Motion detection may be carried out by various methods or algorithms.

Next, the three-dimensional position of a pixel that has been determined to be in motion is calculated at 660. This process is discussed more fully below with respect to FIG. 8.

Next, a determination is made whether additional pixels remain for which three-dimensional position has not been calculated at 675. If so, ("yes" at 675), then the process returns to motion detection for the next pixel at 650. If not, ("no" at 675), then the three-dimensional and image data for multiple sets of images (each set created by a stereo camera pair) are combined at 680. This combination results in image and three-dimensional data for each of the sets of camera images.

From that data, three dimensional data for the three-dimensional space may be generated at 685. This data my take the form of a proprietary format combining the image data, performing seam blending for the combined images (discussed below with respect to FIG. 9) and three-dimensional data defining a depth (or three-dimensional position) for each pixel in each of the sets of images captured by the stereo camera pairs for a captured frame of three-dimensional video.

Finally, a determination is made whether there is another frame of video at 690. If not ("no" at 690), then the process ends. If so ("yes" at 690), then the process returns to capture another set of images at 630 and to capture three-dimensional LIDAR data at 640. In some cases, for example when the generation of three-dimensional data takes place well after the capture of images and three-dimensional LIDAR data, the process may instead return directly to sky extraction at 645 for already-existing images corresponding to the next frame of video. However, when the process takes place in real-time as video frames are created, the next frame of video (in the form of corresponding sets of images) must be captured at 630 and three-dimensional LIDAR data must also be captured at 640 before the process can begin again for the next frame of video.

Figure 8:
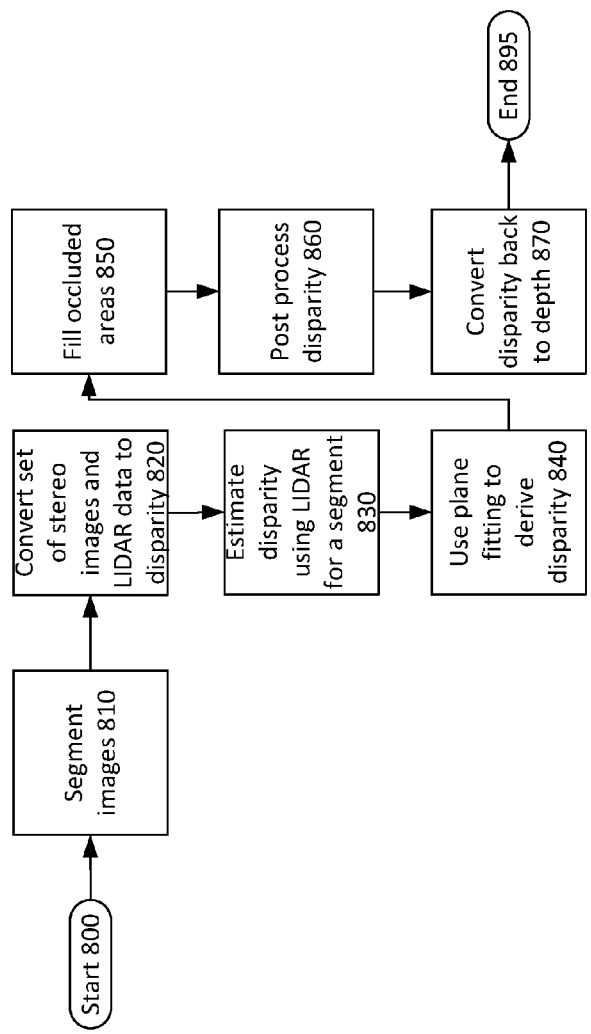
FIG. 8 is a flowchart of a method for combining LIDAR data with stereoscopic camera data to thereby derive three-dimensional data.

FIG. 8 is a flowchart of a method for combining LIDAR data with stereoscopic camera data to thereby derive three-dimensional data. This method may correspond to steps 660-685 of FIG. 6 wherein the three-dimensional position of each pixel in corresponding sets of images is calculated, wherein data from multiple images are combined to create a 360° sphere and wherein three-dimensional data is generated for the three-dimensional space in which the images and three-dimensional LIDAR data were captured.

The first step of generating three-dimensional data for a corresponding set of images and three-dimensional LIDAR data (after capture and pre-processing described with reference to FIG. 6, above) is to segment the images at 810. The segmentation may be designed to minimize the size (perimeter) of each segment and the color variation in each segment. Making the segments smaller results in greater accuracy determining the overall three-dimensional depth within each segment and preferring single colors (or related colors) results in image segments that are likely to be a single object (or a part of a single object). These single objects are likely to have the same or nearly-the-same depth.

So, segments may be algorithmically selected so as to find the smallest and most color-similar segments for each image. Color matching, for example, may be based upon gradient detection, detecting colors within a pre-determined or dynamic range (e.g. dependent upon the full range of the search space or an entire image) as the "same" as other colors in the same range, while determining that colors outside of that range are not the same. Further, smaller segments (i.e. smaller ranges of color) are preferred because the image data is being used to drive the creation of three-dimensional data and smaller segments are more likely to result in accuracy without significant drawbacks in terms of computational complexity.

Once the segmentation is complete, the process converts the stereo images and three-dimensional LIDAR data into disparity data at 820 for use in performing disparity estimation. As used herein, the term "disparity" means the difference (e.g. measured distance) between in-image location for a single object appearing in two corresponding images taken from two different perspectives by one or the other of a stereo camera pair. The process for calculating disparity for stereo image pairs is well-know. As briefly discussed above, two images taken at the same time may be compared, using known intrinsic and extrinsic parameters to identify corresponding pixels in those images. Then, the disparity between the images in either in-image (e.g. 42 pixels or 15 micrometers) or in-reality (e.g. 145 centimeters) may be calculated.

LIDAR data may be converted, to lower the overall complexity of associated mathematics, into disparity data as well. For conversion of three-dimensional LIDAR data to disparity, the data is transformed as a projection to two-dimensional disparity data. However, because the LIDAR data is extremely accurate, it may be relied upon, for the sparse data points it provides, as strictly true. Once corresponding points are identified within an image, the derived LIDAR disparity data may be applied to those portions of the image data as absolutely correct. This enables the LIDAR data to act as seed points for propagating the disparity data for use in the image-based disparity calculations.

Figure 9:
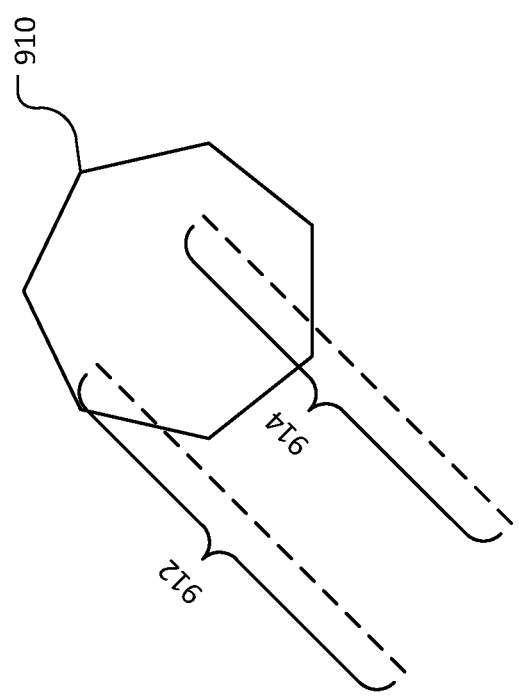
FIG. 9 is a segment of an image with two known LIDAR data points within the segment.

Disparity may be estimated using the image-based disparity and at least one of the converted LIDAR data points (if available) for each segment at 830. For example, FIG. 9 shows a segment 910 with two known LIDAR data points within the segment. Here, the depth 912 and depth 914 of two points within an image segment are known. Because the segment is already determined to be color-similar and as small as possible while maintaining color similarity, the likelihood that the depth within that segment is smooth and relatively uniform is very high. So, knowing the depth 912 and depth 914 based upon the LIDAR data points within that segment can enable extremely accurate estimates of the actual depth of that segment using the disparity data derived therefrom.

Returning to FIG. 8, in order to estimate the disparity using, when available, LIDAR data points for disparity, disparity estimation is first used to narrow the field of available depths that must be searched. Once the images are segmented, the disparity within the segment should be smooth. Even if the segment is not entirely correct, this will be discernible based upon the available LIDAR-based disparity data for that segment.

The disparity for each pixel in a segment may be smoothed by minimizing the difference between two adjacent pixels. This makes sense because it is extremely likely that within a segment with very similar coloration and of a relatively small size, the relative depth of each pixel is likely to be very similar. Further, this estimation can be used to propagate the known-accurate LIDAR disparity data throughout a segment by refusing to alter those pixel depths and only altering those derived from image-based disparity. Performing the smoothing many times, while not altering the pixel depths based upon LIDAR disparity data, results in a relatively accurate disparity estimate across each segment.

Based upon the estimated values generated as described above, plane fitting may be used to derive a much more accurate disparity at 840. Plane fitting is essentially an algorithm that attempts to fit a set of values within a plane. In this case, the values are the disparity data, both that derived from the image data and that derived from LIDAR data.

Here, the overall disparity of a segment is continuous and not discrete. So, the search space could be infinity to generate a precise value (e.g. a floating point value). This makes the problem difficult to solve. For example, deriving a precise depth value using a multi-label convex optimization problem is not an acceptable solution because the search space is too large.

However, fitting the known disparities into a plane tends to be accurate in such cases and substantially limits the potential values for disparity across a given segment. To do so, a plane is parameterized with the normal using a point from the disparity to form a plane. However, normal is unknown, except for a few points drawn from the LIDAR data. So, normal may be propagated based upon the known normal from the LIDAR data to replace unknown or incorrect normal for the plane. The disparity may also used to avoid frontal parallel bias. Specifically, all objects in a given segment are assumed to have the same disparity. However, plane fitting, reliant upon LIDAR data resolves potential problems related to "slanted" or curved surfaces. The infinite possible combinations of normal and disparity can be addressed using random initialization. Using random initialization, some correct data is injected into the plane fitting algorithm, even if by accident, and the LIDAR data is known to be correct. From there, the correct data can be propagated across the segment.

The disparity is initialized within the range of the pre-computed disparity estimated above. The normal are initialized in the range of 0.5 to 1, because objects with extreme slants or angles are unlikely. Then, good samples may be propagated spatially across a segment with the normal and disparity being randomly perturbed.

The costs are computed using adaptive support weightings. For the spatial propagation, the cost that uses the plane parameters from neighboring pixels are compared with the original cost (e.g. the random cost or previously-estimated cost). If the original cost is lower, then the plane parameters are updated. In order to inject random perturbation, the plane parameters are randomly changed within a small variance and the cost is re-compared against the original cost. If the updated cost is lower, then the plane parameters are updated again. This process is repeated until convergence. In practice, this convergence is relatively rapid. If desired, the iterations may be intentionally limited to a specific number of iterations or total run-time in order to speed the results. Other methods are available, but proved to be less-efficient.

The next stage of the disparity estimation to fill occluded areas at 850. A left-right consistency check may be performed between the left disparity map and right disparity map. If a difference in disparity between the left and right disparity maps is greater than 0.5 and the deviation between the angles of the normal vectors is larger than 5, then the area is labeled as an occlusion. There are other methods for occlusion detection, but methods to detect occlusion may be employed in order to better fit the resulting three-dimensional data to a three-dimensional space while accommodating for partial occlusion in images. When occlusion is detected, each occluded pixel is replaced with data corresponding to the nearest non-occluded pixel by extending the plane computed from the previous stage.

Next, post-processing is performed by applying a weighted median filter to the disparity maps. The weighted median filter is useful for smoothing the overall disparity map by removing outliers while preserving hard edges (e.g. large changes in depth that are more than a single point, but appear to be an edge). Methods for applying weighted median filters to data generally are known.

Finally, the disparity data may be converted back to depth data or three-dimensional data at 870. The calculations above are completed as disparity calculations because it greatly simplifies the depth calculations. Despite having three-dimensional LIDAR data available, the disparity derived from the stereo images is much easier to work from than the three dimensions. Rather than operating in three dimensions with each calculation, the calculations are, generally, limited to two dimensions.

Once the disparity is determined using the above-described process, the disparity may be translated back into three-dimensional data suitable for generating a three-dimensional scene, for example for a video. The images of the scene may be intelligently combined with the depth data to create a visually-accurate, based upon the images, and three-dimensionally-accurate recreation of a three-dimensional space. Unlike typical spherical "stitched" photography, the resulting three-dimensional data (which may include frame-by-frame video data) includes both images, stitched together and three-dimensional data indicating the contours and physical depth of objects within those images. Together, the three-dimensional data created as a result of these processes may be used to accurately and visually recreate a three-dimensional space having perceptible depth for virtual reality or augmented reality application.

Once the data is converted back into depth or three-dimensional data at 870, the process ends at 895.

Figure 10:
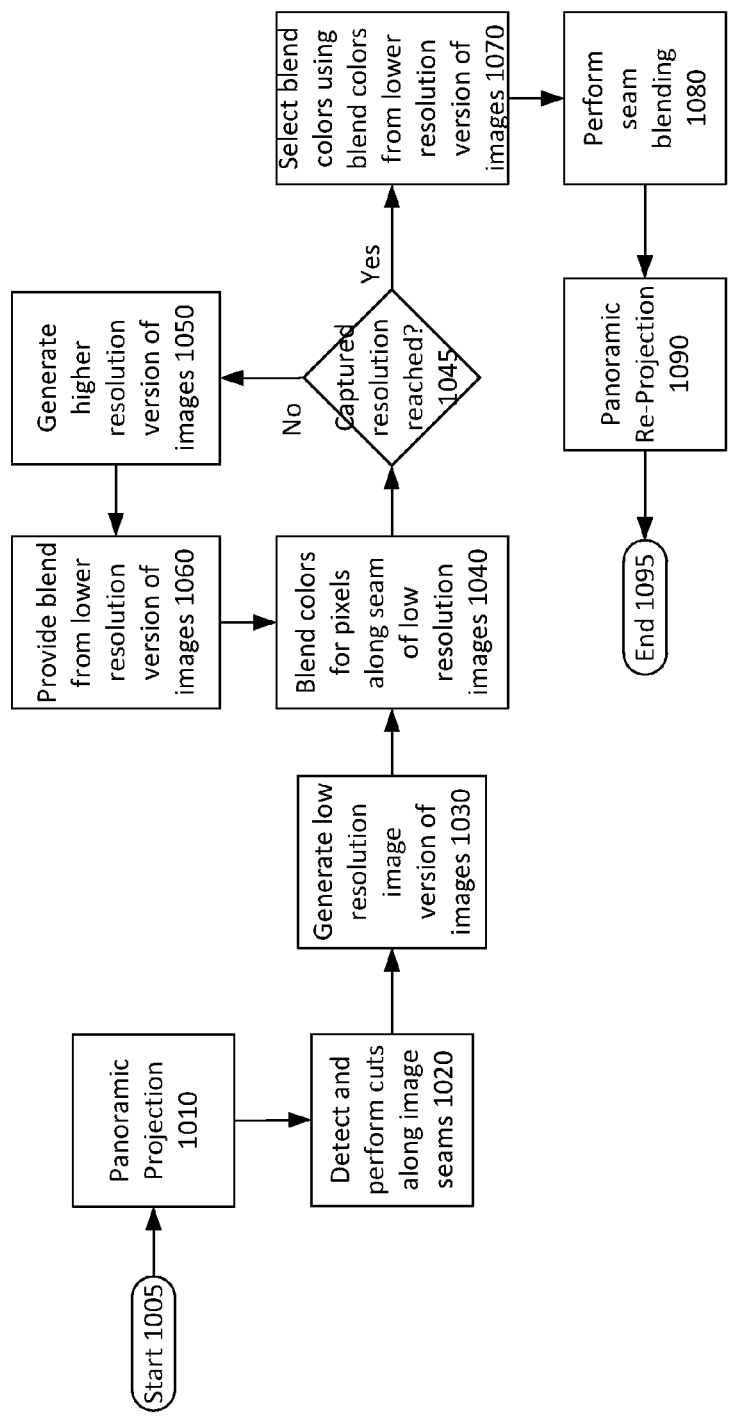
FIG. 10 is a flowchart of a method for blending seams between stereographic images that are stitched into a single, three-dimensional image.

Turning now to FIG. 10, a flowchart of a method for blending seams between stereographic images that are stitched into a single, three-dimensional image is shown. The seam blending process is only a part of the large process of reprojection of the images taken into a virtual three-dimensional space. For context, the overarching process is discussed generally, with specific reference to FIG. 10, but FIG. 10 focuses on the seam blending process. Although the process of FIG. 10 is shown with a start 1005 and an end 1095, the process may take place simultaneously on multiple cores or processors for independent portions of a video frame and may be iterative for an entire three-dimensional video.

Generally, once the three-dimensional position is calculated for each pixel in the images created by each camera, a point cloud fusion algorithm is applied. The point cloud fusion algorithm includes an initial panoramic projection at 1010, optimal seam finding at 1020, color correction (e.g. seam blending) at 1030-1080, and finally a three-dimensional re-projection of the corrected point cloud with the now-corrected colors at 1090.

The first step is panoramic projection of the three-dimensional point cloud at 1010. Panoramic projection means that the fully three-dimensional data that is created as a result of the stereo image and three-dimensional LIDAR data fusion discussed above is down-converted into a series of effectively flat images arranged in the same manner as the cameras used to capture the images. Panoramic projection simplifies the process of finding the optimal seam (place to visually fuse two images together in the final three-dimensional data) between the three-dimensional point clouds by enabling the system to find the seams in the two-dimensional domain instead of the three-dimensional domain. Again, the math for two-dimensions is typically much simpler and, thus, the processing power and time required are similarly lowered. Further, panoramic projection simplifies color correction along seams by enabling correction in the two-dimensional domain instead of in the three-dimensional domain using a Poisson equation with comparable results.

Finally, using panoramic projection, the process of image meshing is much simpler than dealing with complex three-dimensional structures or the point cloud itself using a marching cubes algorithm or Poisson reconstruction algorithm. Instead, the mesh may be relatively simply connected based on the panorama. This works sufficiently well for purposes of virtual reality environments because individuals viewing the three-dimensional space within the VR headset will be centralized in the panoramic projection's center with limited movement. As a result, the meshing based on the panorama actually looks very natural and compelling, while maintaining the overall three-dimensional aspects of the three-dimensional space.

The panorama projection, which may be called a polygon projection, may be understood with reference to FIG. 11, made of up FIGS. 11A and 11B. The shape of the polygon projection is dependent on the configuration of the original camera rig used to capture the stereo images. The polygon projection 1100 shown in FIGS. 11A and 11B is based upon a seven-sided (14 camera) rig. FIG. 11A is the prism in open form so the planes 1110-1116 may be seen, whereas FIG. 11B is the prism as formed into the polygon projection so that the planes 1110-1116 form a prism. In such a prism, the viewer within a virtual reality environment being re-created by the polygon projection would be placed substantially in the center of the polygon projection 1100. As can be seen, each of the sides which represent one set of stereo images (stereo cameras) is represented in the polygon projection. Thus, the camera rig used for the polygon projection 1100 in FIGS. 11A and 11B was a pentagonal prism, with the front camera pairs representing each rectangular plane and the top and bottom camera pairs representing the top and bottom pentagon planes.

A significant advantage of the polygon projection 1100 is that it enables equal sampling at every portion of the panorama because each side is directly parallel to the capturing camera. In contrast, if a traditional spherical projection were used, additional hole filling would be required due to the lack of pixel in between the viewpoint at two cameras. The polygon projection also has the ability to show the same resolution of panorama with less pixels compared to traditional spherical projection. There are a lot of unneeded pixels on the North pole and South pole of a spherical projection once applied due to uneven sampling. The polygon projection has equal sampling in every image.

Returning to FIG. 10, after panoramic projection is applied at 1010, image seams must be detected and cuts performed along those seams at 1020. Image seams are those places in each image at which two images will be joined. An optimal seam cut is needed to separate the point cloud from adjacent views. The main reason being that it is impossible for the camera calibration and three-dimensional position calculations to be perfect. Thus, the points that are supposed to be the same (overlapping) from different cameras have some deviation in their relative positions. When a polygon projection is done without seam blending, this causes ghosting artifacts. In short, the same objects appear twice in the overlapping images and, thus, their images (and their associated three-dimensional data) appear in the projection. This is undesirable. Therefore, these repeated objects in both the images and more particularly in the point cloud must be eliminated and the data must be spliced and blended intelligently to accurately represent reality and to eliminate ghosted artifacts. There exist many ways to perform the cut along the seams. The present process could work equally well with any of those cut selection and implantation processes.

However, an ideal cut preferably takes place in a seam in a low gradient areas (i.e. areas in which color and depth are relatively uniform). If cuts are made along these seams are used visual artifacts are less likely to be perceivable by a viewer within the resulting scene. Seams may be automatically selected based upon relatively similar colors and depths by selecting the seam that minimizes the change in color along the seam. The selected image seam may or may not be selected as a straight line, depending on the implementation.

After selecting the optimal seam for performing a cut and splice, color correction is needed because there will likely be obvious color discontinuity at the seam. It is known that camera sensors have inherent differences, even in the same model cameras typically used in the camera rigs described herein. As a result, even the original images themselves will have slight differences in color for the various objects within the images. This can occur even after color balancing and after white balance and gains are adjusted. The different positioning of the cameras will also result in different response to external lighting causing slight, or sometimes large, color difference between views. Various color correction methods may be used. Preferably, Poisson blending may be used because it aims to solve the color correction problem in the gradient domain. In a detected seam, there is always an unwanted gradient. So Poisson blending works well to perform color correction in the seams. Again, various methods may be employed, but preferably the selected method minimizes the color change across (and around) an image seam.

In order to lower the search domain for appropriate color correction color selection, when performing color correction, first, a low resolution version of the images to be blended is created at 1030. For high resolution images, the number of iterations can be quite large before convergence. Therefore, a multi-resolution approach may be used to reduce the computation. Once the seam is identified at 1020 and the low-resolution generated at 1030, a blend color may be selected and a blend performed for the low resolution image at 1040. At a relatively low resolution, the process can occur quickly and at a low computational cost. The resulting blend is saved and linearly interpolated for higher resolution images.

Next, a determination whether the resolution of that image is the same as the captured resolution is made at 1045. In the first pass, this will of course not be the case ("no" at 1045), but in later passes it may be. Next, a slightly-higher resolution image is created at 1050. The blend used at the lower resolution and saved is used to perform a new blind at the higher resolution (still low) at 1040 and the captured resolution is again compared to the low resolution image at 1045. This process will repeat until the original resolution is reached and, thus, the blend is complete.

Eventually, when the captured resolution is reached ("yes" at 1045), then blend colors are selected using those from the nearest lower-resolution version of the images at 1070 and seam blending is performed at 1080. At each higher-resolution, the color differences may be up-sampled with bicubic interpolation separately according to the new higher resolution seam. This means that only those pixels that are classified from the same image would affect the result when upsampled for the higher resolution. Further, the process of separation ensures that no color artifacts will appear near the seam.

Finally, panoramic re-projection is applied at 1090 to re-create the three-dimensional space using the, now corrected and color-corrected, three-dimensional data. Depending on the display device (e.g. the target virtual reality headset or other environment), different three-dimensional re-projection approaches may be used.

If the target virtual reality headset has a positional tracker, the three-dimensional data points may be connected as a mesh with the mesh representative of the three-dimensional space. For each pixel in the mesh, the (x,y) coordinate simply serves as container without containing geometrical meaning. Each pixel associates to a set of three-dimensional points (X,Y,Z), and the three-dimensional points are connected to the "adjacent" points according to the (x,y) coordinate three-dimensional points to form a closed mesh. Even though there may be large streaking at vast depth discontinuities, this is preferable to seeing a large empty space within the large depth discontinuities which can appear to a wearer as a virtually infinite "black hole". It is inevitable that there will be occlusions at the depth discontinuities which are not captured by either camera. Therefore, filing these occlusions is generally impossible to do accurately. Though, while not necessarily desirable, these large depth discontinuities may be addressed using a heuristic.

If a target virtual reality headset (or other device) does not have a positional tracker, the three-dimensional data points are re-projected into a stereo panorama. In these situations, the viewer will experience a three-dimensional movie with depth, as opposed to movement within a three-dimensional space recreated using three-dimensional data. Because the headset has no positional tracker, there is no need to recreate the three-dimensional space completely. The user will not be able to "move" within the space anyway. So, both data size and computational complexity may be lessened by re-projection into stereo panorama which still will provide depth from the stereo images, but merely from a single perspective.

Virtual reality headsets that do not have positional tracking often have a less-powerful processor. These processors often cannot adequately run complex graphics engine capable of full three-dimensional rendering, but virtually all such devices are capable of decoding two-dimensional video for playback. Thus a stereo panorama is perfect for these devices, because the panorama will create the sensation of three-dimensions while enabling a viewer to turn within the environment, but can be shown as a conventional two-dimensional video.

Because the system knows the three-dimensional location of each pixel, a stereo panorama may be generated by collecting rays that are all tangent to a common viewing circle. This method known in the relevant art. However, existing approaches collect the rays by moving the stereo cameras manually or mechanically to get multiple images and then extracting the center column pixel to get a dense sample of the rays. It is preferable to collect a number of rays that are all tangent to a common viewing circle by synthesizing virtual view points since the three-dimensional data point cloud is reconstructed via three-dimensional LIDAR data and stereo camera fusion. As a result any virtual view point (within constraints) can be reconstructed by automatically collecting a number of rays that are all tangent to a common viewing circle.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of" respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system for capturing live action three-dimensional video comprising:
   a first and a second camera, making up a stereo camera pair, the first and second stereo cameras each having known imaging parameters such that a depth-from-stereo algorithm may be applied to corresponding sets of images captured using the stereo camera pair to generate three-dimensional camera data for a three-dimensional space viewed by the stereo camera pair;
   a LIDAR, having a known position relative to the stereo camera pair, configured to produce three-dimensional LIDAR data;
   a time-stamp device for applying a first time-stamp to the three-dimensional camera data and a second time-stamp to the three-dimensional LIDAR data; and
   a controller configured to
      use the depth-from-stereo algorithm to generate the three-dimensional camera data for the three-dimensional space, and
      combine the three-dimensional camera data and the three-dimensional LIDAR data, by using the three-dimensional LIDAR data to set a correct depth at locations in the three-dimensional space where three-dimensional LIDAR data is available and by using the three-dimensional camera data where three-dimensional LIDAR data is unavailable to thereby generate three-dimensional data corresponding to the three-dimensional space.

2. The system of claim 1 wherein the controller is for calibrating the LIDAR by calculating the extrinsic parameters between the LIDAR and the stereo camera pair, the controller further configured to:
   detect, within the corresponding sets of images, a visual radius and a visual location of a circular hole within an external marker at a location;
   detect, within the three-dimensional LIDAR data, a LIDAR radius and an LIDAR location of the circular hole within the external marker at the location;
   repeat the detection for a second visual radius, a second visual location, a second LIDAR radius, and a second LIDAR location at a second location;
   calculate the rotation and translation between the stereo camera pair and the LIDAR.

3. The system of claim 1 wherein the controller is further for calculating the depth of a sufficient number of pixels in the corresponding sets of images to create the three-dimensional data, the controller further configured to:
   generate two-dimensional camera disparity data using the corresponding sets of images;
   translate the three-dimensional LIDAR data to two-dimensional LIDAR disparity data;
   segment the two-dimensional camera disparity data into segments by identifying likely corresponding two-dimensional image features within the two-dimensional disparity camera data;
   identifying at least one two-dimensional LIDAR disparity data point within each segment;
   set each two-dimensional LIDAR disparity data point as a depth for each corresponding pixel within each segment;
   apply a plane-fitting algorithm using the two-dimensional LIDAR disparity data to refine the two-dimensional camera disparity data into corresponding depth data for each pixel other than the corresponding pixel within the two-dimensional camera disparity data; and
   convert the depth data into the three-dimensional data.

4. The system of claim 3 wherein the controller is further configured, prior to conversion to the three-dimensional data, to apply occlusion filling to portions of each segment that appear to be occluded in the three-dimensional camera data and to smooth the depth data using a weighted median filter.

5. The system of claim 1 wherein the stereo camera pair, the LIDAR, and the controller act in concert over a period of time to generate the three-dimensional data as a three-dimensional video corresponding to the three-dimensional space over the period of time.

6. The system of claim 5 wherein the controller is further configured to:
   perform motion detection on each pixel within a second frame of the three-dimensional video to determine if movement is reflected in a particular pixel relative to the particular pixel in a first frame of the three-dimensional video; and
   only when the particular pixel within the three-dimensional video shows movement from the first frame to the second frame, calculate the three-dimensional position of the particular pixel.

7. The system of claim 5 wherein the first time-stamp and the second time-stamp are used to time correlate the three-dimensional camera data with the three-dimensional LIDAR data.

8. The system of claim 1 wherein the controller is further configured to extract portions of the three-dimensional camera data that the three-dimensional LIDAR data indicates have a depth likely to correspond to sky.

9. The system of claim 1 further comprising a plurality of stereo camera pairs, all working in concert to generate 4 pi steradian three-dimensional camera data that may be combined with the LIDAR data to generate 4 pi steradian three-dimensional data corresponding to the three-dimensional space visible to each of the stereo camera pairs.

10. The system of claim 1 wherein the three-dimensional LIDAR data controls when combined with the three-dimensional camera data particularly in areas within the three-dimensional space without texture, having full or partial occlusion from the stereo camera pair, or having photometric variations.

11. The system of claim 1 further wherein a global positioning system is the time-stamping device used as a generator locking system to create the first time-stamp and the second time-stamp for later use in time correlating the three-dimensional camera data and the three-dimensional LIDAR data.

12. A system for capturing live action three-dimensional video comprising:

a plurality of stereo camera pairs, each made up of a first stereo camera and a second stereo camera each camera having known imaging parameters such that a depth-from-stereo algorithm may be applied to corresponding sets of images captured using each of the plurality of stereo camera pairs to generate three-dimensional camera data for a three-dimensional space viewed by the plurality of stereo camera pairs;

a LIDAR, having a known position relative to the stereo camera pair, configured to produce three-dimensional LIDAR data;

a time-stamp device for applying a first time-stamp to the three-dimensional camera data and a second time-stamp to the three-dimensional LIDAR data; and a controller configured to
use the depth-from-stereo algorithm to generate the three-dimensional camera data for the three-dimensional space, and
combine the three-dimensional camera data and the three-dimensional LIDAR data, by using the three-dimensional LIDAR data to set a correct depth at locations in the three-dimensional space where three-dimensional LIDAR data is available and by using the three-dimensional camera data where three-dimensional LIDAR data is unavailable to thereby generate three-dimensional data corresponding to the three-dimensional space.

13. The system of claim 12 wherein the controller is for calibrating the LIDAR by calculating the extrinsic parameters between the LIDAR and the plurality of stereo camera pairs, the controller further configured to:
detect, within each of the corresponding sets of images, a visual radius and a visual location of a circular hole within an external marker at a location;
detect, within the three-dimensional LIDAR data, a LIDAR radius and an LIDAR location of the circular hole within the external marker at the location;
repeat the detection for a second visual radius, a second visual location, a second LIDAR radius, and a second LIDAR location at a second location;
calculate the rotation and translation between the stereo camera pair and the LIDAR.

14. The system of claim 12 wherein the controller is further for calculating the depth of a sufficient number of pixels in the corresponding sets of images to create the three-dimensional data, the controller further configured to:
generate two-dimensional camera disparity data using the corresponding sets of images;
translate the three-dimensional LIDAR data to two-dimensional LIDAR disparity data;
segment the two-dimensional camera disparity data into segments by identifying likely corresponding two-dimensional image features within the two-dimensional disparity camera data;
identifying at least one two-dimensional LIDAR disparity data point as within each segment;
set each two-dimensional LIDAR disparity data point as a depth for each corresponding pixel within each segment;
apply a plane-fitting algorithm using the two-dimensional LIDAR disparity data to refine the two-dimensional camera disparity data into corresponding depth data for each pixel other than the corresponding pixel within the two-dimensional LIDAR disparity data; and
convert the depth data into the three-dimensional data.

15. The system of claim 14 wherein the controller is further configured, prior to conversion to the three-dimensional data, to apply occlusion filling to portions of each segment that appear to be occluded in the three-dimensional camera data and to smooth the depth data using a weighted median filter.

16. The system of claim 12 wherein the plurality of stereo camera pairs, the LIDAR, and the controller act in concert over a period of time to generate the three-dimensional data as a three-dimensional video corresponding to the three-dimensional space over the period of time.

17. The system of claim 16 wherein the controller is further configured to:
perform motion detection on each pixel within a second frame of the three-dimensional video to determine if movement is reflected in a particular pixel relative to the particular pixel in a first frame of the three-dimensional video; and
only when the particular pixel within the three-dimensional video shows movement from the first frame to the second frame, calculate the three-dimensional position of the particular pixel.

18. The system of claim 16 wherein the first time-stamp and the second time-stamp are used to time correlate the three-dimensional camera data with the three-dimensional LIDAR data.

19. The system of claim 12 wherein the controller is further configured to extract portions of the three-dimensional camera data that the three-dimensional LIDAR data indicates have a depth likely to correspond to sky.

20. The system of claim 12 wherein the plurality of stereo camera pairs work in concert to generate 4 pi steradian three-dimensional camera data that may be combined with the LIDAR data to generate 4 pi steradian degree three-dimensional data corresponding to the three-dimensional space visible to the plurality of stereo camera pairs.

21. The system of claim 12 wherein the three-dimensional LIDAR data controls when combined with the three-dimensional camera data particularly in areas within the three-dimensional space without texture, having full or partial occlusion from the plurality of stereo camera pairs, or having photometric variations.

22. The system of claim 12 further wherein a global positioning system is the time-stamping device used as a generator locking system to create the first time-stamp and the second time-stamp for later use in time correlating the three-dimensional camera data and the three-dimensional LIDAR data.

23. Apparatus comprising a non-transitory storage medium storing a program having instructions which when executed by a processor will cause the processor to generate three-dimensional data, the instructions of the program for:
generating three-dimensional camera data for a three-dimensional space viewed by a plurality of stereo camera pairs, each made up of a first stereo camera and a second stereo camera each camera having known imaging parameters such that a depth-from-stereo algorithm may be applied to corresponding sets of images;
producing three-dimensional LIDAR data using a LIDAR;
applying a first time-stamp to the three-dimensional camera data and a second time-stamp to the three-dimensional LIDAR data;
using the depth-from-stereo algorithm to generate the three-dimensional camera data for the three-dimensional space; and
combining the three-dimensional camera data and the three-dimensional LIDAR data, by using the three-dimensional LIDAR data to set a correct depth at locations in the three-dimensional space where three-dimensional LIDAR data is available and by using the three-dimensional camera data where three-dimensional LIDAR data is unavailable to thereby generate three-dimensional data corresponding to the three-dimensional space.

24. The apparatus of claim 23 further comprising:
the processor;
a memory; and
wherein the processor and the memory comprise circuits and software for performing the instructions on the storage medium.

* * * * *